United States Patent
Bauerle et al.

(10) Patent No.: US 7,306,542 B2
(45) Date of Patent: Dec. 11, 2007

(54) ELECTRONIC THROTTLE CONTROL (ETC) DRAG TORQUE REQUEST SECURITY

(75) Inventors: Paul A. Bauerle, Fenton, MI (US); Kerfegar K. Katrak, Fenton, MI (US); Colin A. Roberts, Holly, MI (US); Matthew Squire, Holly, MI (US)

(73) Assignee: General Motors Corporation, Detroit, MI (US)

(*) Notice: Subject to any disclaimer, the term of this patent is extended or adjusted under 35 U.S.C. 154(b) by 174 days.

(21) Appl. No.: 10/831,655

(22) Filed: Apr. 23, 2004

(65) Prior Publication Data
US 2005/0239599 A1 Oct. 27, 2005

(51) Int. Cl.
F16H 61/00 (2006.01)

(52) U.S. Cl. .................. 477/118; 477/107; 477/110; 477/115; 477/156; 701/84; 701/85; 701/110; 123/396

(58) Field of Classification Search ............. 477/107, 477/110, 115, 118, 156, 90, 906, 907; 701/84, 701/85, 110; 123/396
See application file for complete search history.

(56) References Cited

U.S. PATENT DOCUMENTS

| | | | |
|---|---|---|---|
| 5,692,472 A * | 12/1997 | Bederna et al. | 123/350 |
| 6,240,355 B1 * | 5/2001 | Schmitt | 701/84 |
| 6,285,946 B1 * | 9/2001 | Steinmann | 701/110 |
| 6,287,237 B1 * | 9/2001 | Graf et al. | 477/94 |
| 6,535,809 B1 * | 3/2003 | Beyer et al. | 701/84 |
| 2003/0018426 A1 * | 1/2003 | Bauer et al. | 701/84 |

* cited by examiner

Primary Examiner—David D. Le

(57) ABSTRACT

A throttle control method includes generating a throttle request based on a drag torque request and setting a throttle command equal to the throttle request when the throttle request is less than a throttle idle maximum. A throttle maximum increase is determined when the throttle request is greater than the throttle idle maximum and the throttle command is determined based on the throttle maximum increase. The throttle is controlled based on the throttle command.

36 Claims, 4 Drawing Sheets

US 7,306,542 B2

ELECTRONIC THROTTLE CONTROL (ETC) DRAG TORQUE REQUEST SECURITY

FIELD OF THE INVENTION

The present invention relates to electronic throttle control (ETC), and more particularly to drag torque request security for an ETC system.

BACKGROUND OF THE INVENTION

Wheel slip can occur as a result of engine drag or braking on the driven wheels of a vehicle. More particularly, when a driver suddenly releases the throttle, the engine drag force can become larger than the frictional force between the road and the driven wheels. As a result, the driven wheels slip or skid on the road surface. Vehicle stability can be reduced, especially in the case of a rear-wheel drive vehicle traveling on a low-coefficient of friction surface, such as wet pavement, gravel, ice or snow covered roads and the like.

Vehicle stability systems sometimes include an engine drag control (EDC) module that reduces wheel slip during closed throttle, non-braking deceleration. In general, the EDC module generates a drag torque request that indicates an increase in engine torque that is required to reduce wheel slip and improve vehicle stability. The EDC module can be implemented by an anti-lock braking system (ABS) module and an engine control module (ECM) or other modules and controllers. The ABS module determines the drag torque request and transmits it to the ECM module. The module ECM regulates the engine based on the drag torque request. The drag torque request and resultant throttle control is generated by the EDC module and is not operator generated. Therefore, the drag torque request should be secure and the resultant throttle control not startling to the operator. In other words, the drag torque request should not produce an unsafe driving condition or produce a sudden, high engine torque output that is startling to the operator.

SUMMARY OF THE INVENTION

Accordingly, the present invention provides a method of controlling a throttle. The method includes generating a throttle request based on a drag torque request and setting a throttle command equal to the throttle request when the throttle request is less than a throttle idle maximum. A throttle maximum increase is determined when the throttle request is greater than the throttle idle maximum and the throttle command is determined based on the throttle maximum increase. The throttle is controlled based on the throttle command.

In one feature, the method further includes limiting the throttle request to a throttle maximum.

In another feature, the method further includes storing the drag torque request in first and second memories and comparing the drag torque request from the first and second memories after generating the throttle request. The throttle command is limited to the throttle idle maximum if the drag torque request stored in the first memory does not correspond to the drag torque request stored in the second memory.

In another feature, the method further includes comparing a wheel slip to a wheel slip threshold and limiting the throttle command to the throttle idle maximum when the wheel slip is less than the wheel slip threshold.

In still another feature, the throttle maximum increase is determined based on engine speed and vehicle speed. The throttle maximum increase is determined from a look-up table.

In yet another feature, the throttle command is determined based on the throttle request, the throttle idle maximum, a previous throttle command and the throttle maximum increase. The throttle command is a minimum between the throttle request and a maximum of the throttle idle maximum and a sum of the previous throttle command and the throttle maximum increase.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
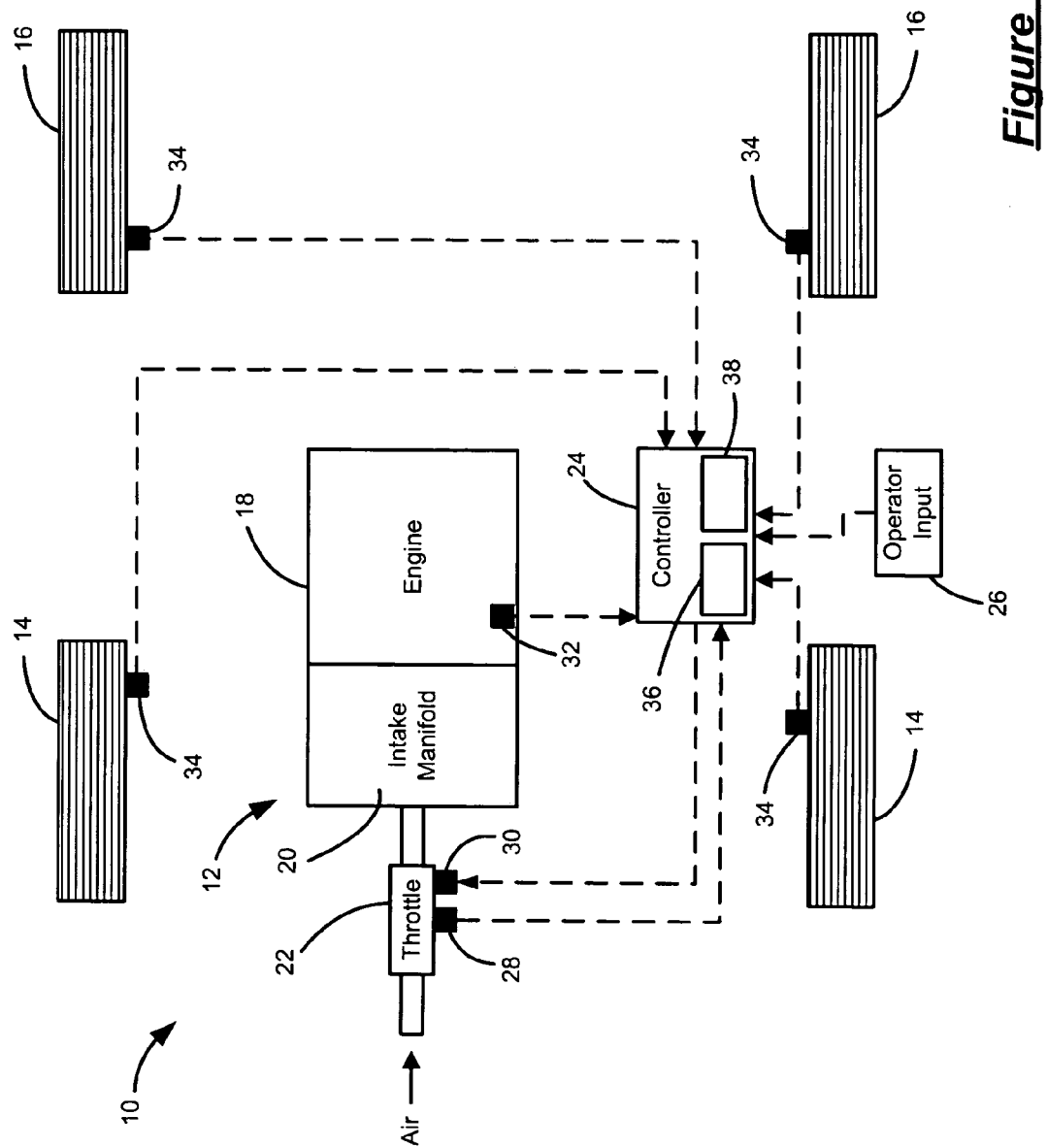
FIG. 1 is a schematic illustration of a vehicle according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle 10 is schematically illustrated. The vehicle 10 includes an engine system 12, driven wheels 14 and/or non-driven wheels 16. The engine system 12 produces drive torque to drive the driven wheels 14. The engine system 12 includes an engine 18, an intake manifold 20 and a throttle 22. Air flow into the intake manifold 20 is regulated by the throttle 22. The air is distributed into cylinders (not shown) of the engine 18. Air is mixed with fuel and combusted within the cylinders to produce the drive torque.

A controller 24 controls overall operation of the vehicle 10 based on vehicle operating parameters and an operator input 26. While a single controller 24 is shown, one or more controllers may be implemented. The operator input 26 can include an accelerator pedal, a brake pedal, cruise control and the like. Generally, the operator input indicates the desired amount of throttling of the engine system 12. A throttle position sensor 28 generates a throttle position signal that is communicated to the controller 24. The controller 24 generates a throttle control signal that is sent to a throttle actuator 30, which regulates the throttle position. An engine speed sensor 32 generates an engine speed signal (RPM) that is communicated to the controller 24. Wheel speed sensors 34 generate wheel speed signals (RPM) that are communicated to the controller 24. The controller 24 calculates vehicle speed based on the wheel speed signals. Additionally, the controller 24 calculates wheel slip as the difference between the wheel speed of the driven wheels 14 and the wheel speed of the non-driven wheels 16.

Figure 2:
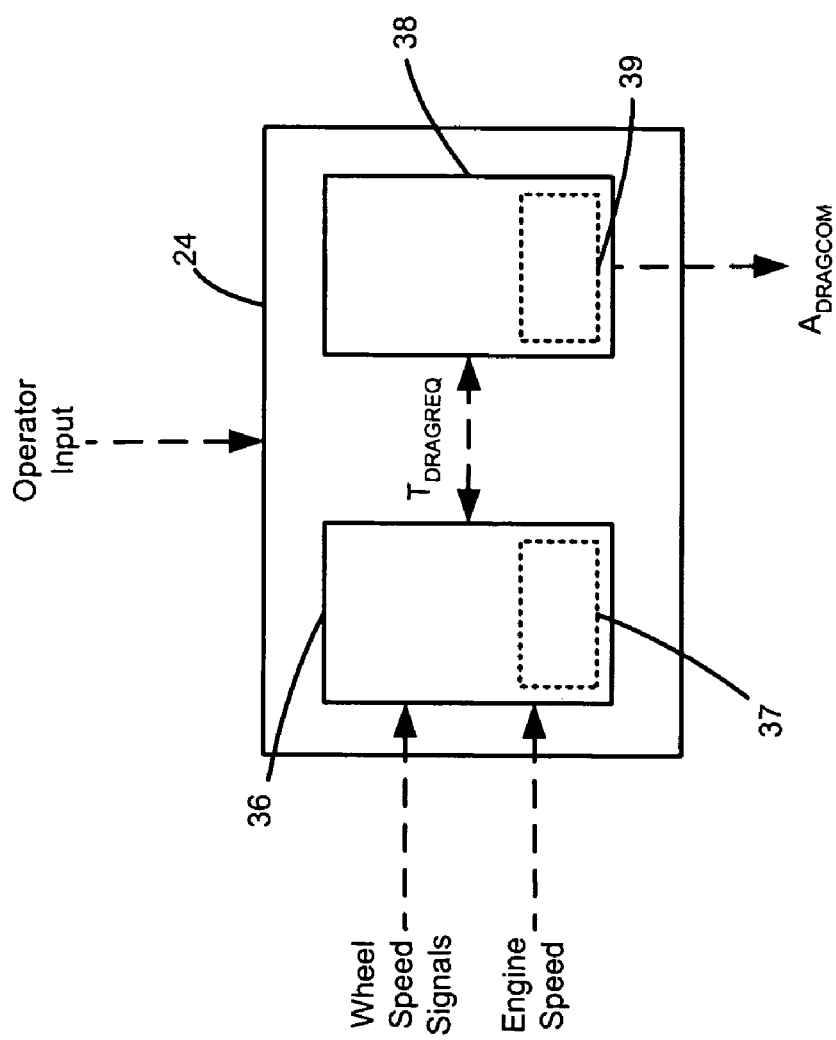
FIG. 2 is a schematic illustration of an electronic drag control (EDC) module according to the present invention.

Referring now to FIG. 2, the controller 24 is schematically illustrated as an electronic drag control (EDC) module that includes a first control module 36 and a second control module 38. The first control module 36 and the second control module 38 communicate via an internal communication network or bus 35. The controller 24 executes engine drag control in the event that wheel slip occurs during non-braking deceleration. More particularly, the controller 24 monitors operator input, engine speed and the wheel speeds to determine whether wheel slip resulting from engine drag is occurring. If wheel slip occurs, the controller 24 adjusts the throttle 22 to reduce engine braking, thereby reducing wheel slip. In general, the first control module 36 determines a drag torque request ($T_{DRAGREQ}$) based on wheel slip and engine speed. $T_{DRAGREQ}$ is communicated to the second control module 38 based on the memory check control described herein. The second control module 38 regulates engine operation according to the drag torque rate limiting control of the present invention.

Figure 3:
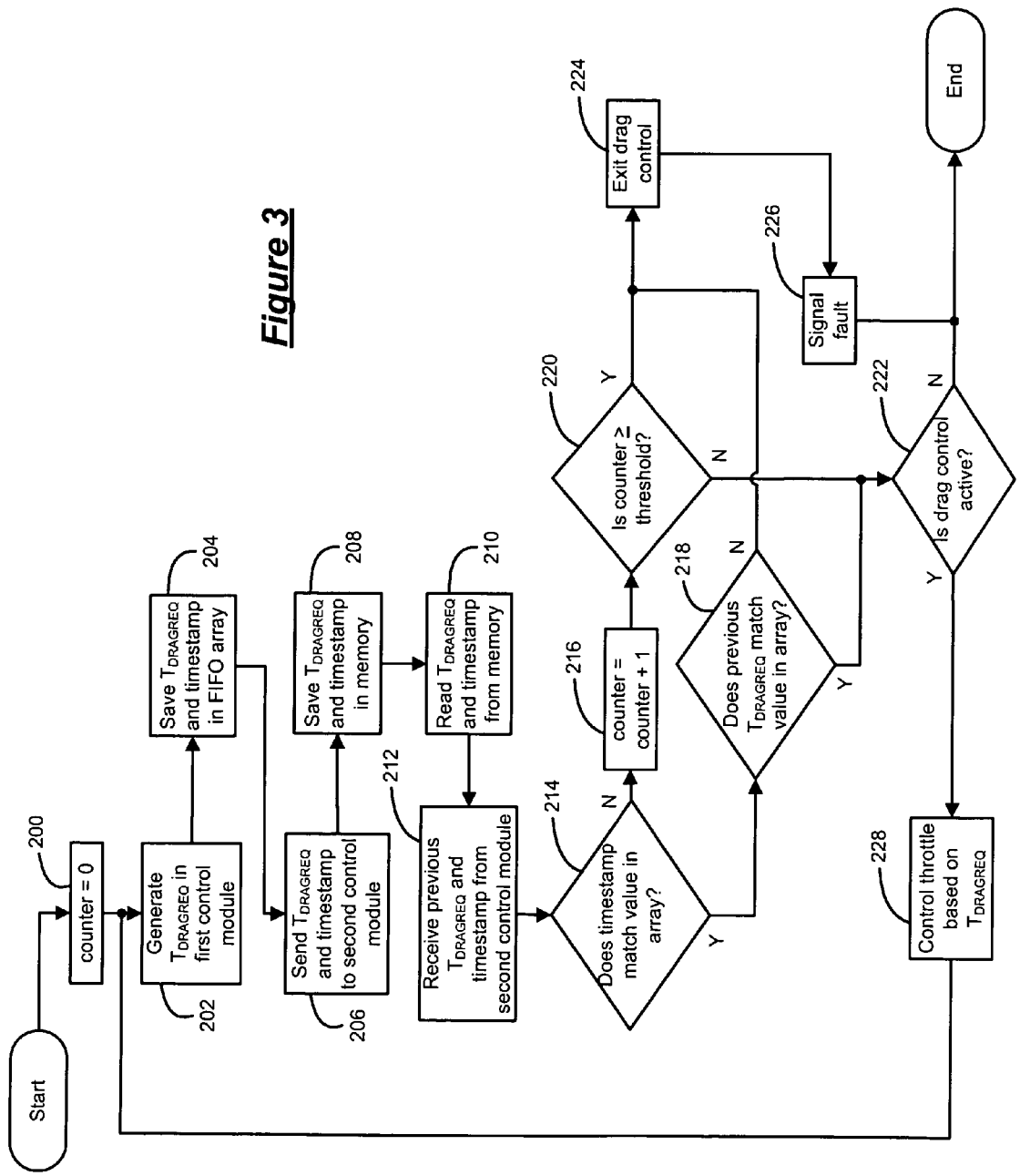
FIG. 3 is a flowchart illustrating the ETC memory check control according to the present invention.

Referring now to FIG. 3, the electronic throttle control (ETC) memory check control will be described in detail. In step 200, control sets a counter equal to zero. In step 202, control generates $T_{DRAGREQ}$. $T_{DRAGREQ}$ is saved along with a corresponding timestamp in a first memory location 37 including a first-in, first-out (FIFO) array (not shown) in step 204. In step 206, $T_{DRAGREQ}$ and the corresponding timestamp are sent to the second control module 38. $T_{DRAGREQ}$ and the corresponding timestamp are saved in a second memory location 39 in step 208. In step 210, a previous $T_{DRAGREQ}$ and corresponding timestamp are read from the second memory location 39. In step 212, the first control module 36 receives the previous $T_{DRAGREQ}$ and corresponding timestamp from the second control module 38.

In step 214, control determines whether the timestamp value corresponding to $T_{DRAGREQ}$ matches the value stored in the FIFO array. If the FIFO array does not include the corresponding timestamp, control continues in step 216. If the FIFO array includes the corresponding timestamp, control continues in step 218. In step 216, control increments the counter by one. Control compares the counter to a counter threshold in step 220. If the counter is less than the counter threshold, control continues in step 222. If the counter is greater than or equal to the counter threshold, control exits drag control in step 224, signals a fault in step 226 and control ends. In this manner, drag control is terminated to avoid improper engine operation based on a corrupted memory value.

Control determines whether $T_{DRAGREQ}$ matches that stored in the FIFO array in step 218. If none of the FIFO array values match $T_{DRAGREQ}$, the memory is deemed faulty and control continues in step 224. If the FIFO array values include $T_{DRAGREQ}$, control continues in step 222. In step 222, control determines whether drag control is active. If drag control is not active, control ends. If drag control is active, control continues in step 228. In step 228, control controls the throttle based on $T_{DRAGREQ}$, as described in further detail below. Once a $T_{DRAGREQ}$/timestamp match is found in the FIFO array, that pair is no longer used for future control iterations (i.e., the pair falls out of the FIFO array).

The ETC memory check control provides a handshaking method in the case where multiple modules execute the ETC drag control of the present invention. For example, in the case where the ABS module generates $T_{DRAGREQ}$ and the ECM controls the throttle based on $T_{DRAGREQ}$, the ETC memory check ensures accurate communication between the modules. Additionally, the ETC memory check monitors for corrupted memory values. More particularly, the ECM controls the throttle based on $T_{DRAGREQ}$ using the same memory variable communicated from the ABS module. In this manner, if the memory value becomes corrupted where the ECM processes it, the same corrupted value is again received by the ABS module.

Figure 4:
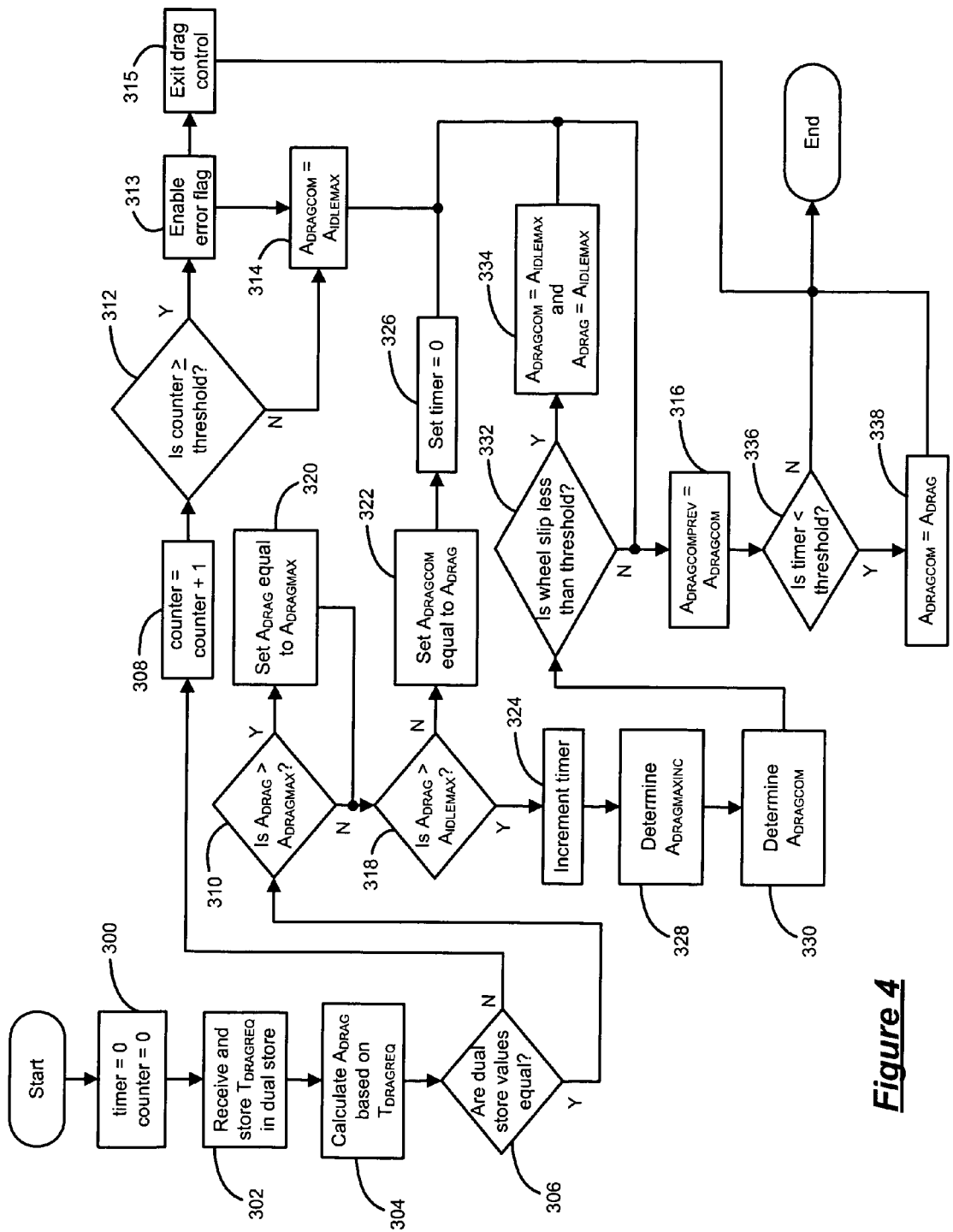
FIG. 4 is a flowchart illustrating the ETC drag torque rate limiting control of the present invention.

Referring now to FIG. 4, the ETC drag torque rate limiting control of the present invention will be described in detail. In general, the ETC drag torque rate limiting control enables $T_{DRAGREQ}$ (up to a maximum) to control engine operation for a brief period (e.g., approximately 100 ms-300 ms) without rate limiting. In this manner, the intake manifold may be filled faster without causing startle. After the brief period, rate limiting is implemented.

In step 300, control sets a timer and a counter equal to zero. In step 302, control receives and stores $T_{DRAGREQ}$ in dual memory stores. The memory stores are preferably provided as RAM variables. It is anticipated that the first RAM variable stores $T_{DRAGREQ}$ and the second RAM variable stores the two's complement of $T_{DRAGREQ}$. In step 304, control calculates a throttle area ($A_{DRAG}$) based on $T_{DRAGREQ}$.

In step 306, control determines whether the stored values are equal. In the case of the first RAM variable storing $T_{DRAGREQ}$ and the second RAM variable storing the two's complement, the sum of the dual stores should equal zero. If the dual store values are not equal, control continues in step 308. If the dual store values are equal, control continues in step 310. In step 308, control increments the counter by one. Control determines whether the counter is less than a counter threshold in step 312. If the counter is less than the counter threshold, control continues sets a drag throttle area command ($A_{DRAGCOM}$) to a maximum idle throttle area ($A_{IDLEMAX}$) in step 314. $A_{IDLEMAX}$ is a pre-selected throttle area such that instantaneous requests for a throttle area at or below this value will not cause discomforting vehicle acceleration. In this manner, control limits $A_{DRAGCOM}$ to $A_{IDLEMAX}$ when the dual stores are consistently unequal and an error flag is enabled indicated a fault (e.g., memory value corruption). Control continues in step 316, as described in further detail below. If the counter is greater than or equal to the counter threshold, control enables an error flag in step 313, exits drag control in step 315 and control ends.

Control determines whether $A_{DRAG}$ is greater than a maximum drag throttle area ($A_{DRAGMAX}$) in step 310. If $A_{DRAG}$ is less than $A_{DRAGMAX}$, control continues in step 318. If $A_{DRAG}$ is greater than $A_{DRAGMAX}$, control sets $A_{DRAG}$ equal to $A_{DRAGMAX}$ in step 320 and continues in step 318. In this manner, $A_{DRAG}$ is limited by $A_{DRAGMAX}$. In step 318, control determines whether $A_{DRAG}$ is greater than $A_{IDLEMAX}$. If $A_{DRAG}$ is not greater than $A_{IDLEMAX}$, control continues in step 322. If $A_{DRAG}$ is greater than $A_{IDLEMAX}$, control continues in step 324. In step 322, control sets $A_{DRAGCOM}$ equal to $A_{DRAG}$. Control resets the timer to zero in step 326 and continues in step 316.

Control increments the timer by one in step 324. In step 328, control determines a maximum drag throttle area increase ($A_{DRAGMAXINC}$). $A_{DRAGMAXINC}$ is the maximum amount of throttle area increase allowed for drag control. $A_{DRAGMAXINC}$ is determined from a look-up table based on engine speed (RPM) and vehicle speed. In step 330, control determines $A_{DRAGCOM}$ based on $A_{DRAG}$, $A_{IDLEMAX}$, the previous drag command ($A_{DRAGCOMPREV}$) and $A_{DRAGMAXINC}$. $A_{DRAGCOM}$ is determined according to the following:

$$A_{DRAGCOM} = \min(A_{DRAG}, \max(A_{IDLEMAX}, (A_{DRAGCOMPREV} + A_{DRAGMAXINC})))$$

In step 332, control determines whether the wheel slip is less than a threshold. The wheel slip threshold indicates the point at which the wheel slip has become so low that wheel slip is on the verge of ceasing (i.e., driven wheel speed is almost equal to non-driven wheel speed). If the wheel slip is less than the threshold, control continues in step 334. If the wheel slip is not less than the threshold, control continues in step 316. In step 334, control sets $A_{DRAGCOM}$ equal to $A_{IDLEMAX}$ and $A_{DRAG}$ equal to $A_{IDLEMAX}$ and control continues in step 316.

In step 316, control sets $A_{DRAGCOMPREV}$ equal to $A_{DRAGCOM}$. In this manner, $A_{DRAGCOMPREV}$ is updated for use in step 330 in the next loop of the ETC drag torque request security control. In step 336, control determines whether the timer is less than a threshold. The threshold can be within the range of 100 ms-400 ms. If the timer is not less than the threshold, control ends. If the timer is less than the threshold, $A_{DRAGCOM}$ is set equal to $A_{DRAG}$ in step 338 and control ends. The timer monitors how often $A_{DRAG}$ is greater than $A_{IDLEMAX}$. If $A_{DRAG}$ is greater than $A_{IDLEMAX}$ for less than the threshold time, $A_{DRAGCOM}$ is set equal to $A_{DRAG}$. In this manner, $A_{DRAG}$ is not rate limited until the threshold expires.

The ETC drag torque rate limiting control limits the rate of drag torque to improve operating comfort. Further, the ETC drag torque rate limiting control improves ETC security during periods of drag control. More particularly, the ETC drag torque rate limiting control limits drag requests up to a maximum calibration greater than $A_{IDLEMAX}$. That is to say, $A_{DRAGCOM}$ is rate limited when above $A_{IDLEMAX}$. Further, full drag authority is enabled for a period of time when first transitioning above $A_{IDLEMAX}$. In this manner, the intake manifold is filled faster. However, after continuous requests above $A_{IDLEMAX}$, $A_{DRAGCOM}$ is rate limited. If driven wheel speed comes close to or exceeds the non-driven wheel speed at any time during the drag event, $A_{DRAGCOM}$ is set to $A_{IDLEMAX}$. In this manner, the wheel speed feedback provides an inferred drag check.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A drag torque control system for a vehicle engine, comprising:
   a throttle that regulates a torque output of said engine;
   a control module that saves first and second drag torque requests in first and second memories, respectively, said second drag torque request being equal to said first drag torque request, which is determined based on vehicle operating parameters, wherein said control module compares said first and second drag torque requests to one another to monitor for corrupted memory values and generates a throttle control signal based on one of said first and second drag torque requests when said first and second drag torque requests match, wherein said throttle is regulated based on said throttle control signal to achieve said one of said first and second drag torque requests.

2. The drag torque control system of claim 1 wherein said control module indicates a fault when said first and second drag torque requests do not match a threshold number of times.

3. The drag torque control system of claim 1 wherein said control module sets said throttle control signal to a maximum idle value when said first and second drag torque requests do not match less than a threshold number of times.

4. The drag torque control system of claim 1 wherein said control module sets said throttle control signal equal to a throttle request when said throttle request is less than a throttle idle maximum, determines a throttle maximum increase when said throttle request is greater than said throttle idle maximum, determines said throttle control signal based on said throttle maximum increase and controls said throttle based on said throttle control signal.

5. The drag torque control system of claim 4 further comprising limiting said throttle request to a throttle maximum.

6. The drag torque control system of claim 4 further comprising wheel speed sensors that generate wheel speed signals, wherein said control module calculates a wheel slip, compares said wheel slip to a wheel slip threshold and limits said throttle control signal to said throttle idle maximum when said wheel slip is less than said wheel slip threshold.

7. The drag torque control system of claim 4 wherein said throttle maximum increase is determined based on engine speed and vehicle speed.

8. The drag torque control system of claim 7 wherein said throttle maximum increase is determined from a look-up table.

9. The drag torque control system of claim 4 wherein said throttle control signal is determined based on said throttle request, said throttle idle maximum, a previous throttle control signal and said throttle maximum increase.

10. The drag torque control system of claim 9 wherein said throttle control signal is a minimum between said throttle request and a maximum of said throttle idle maximum and a sum of said previous throttle control signal and said throttle maximum increase.

11. A drag torque control system for a vehicle engine, comprising:
    a throttle that regulates torque output of said engine;
    a control module that generates a throttle control signal based on a drag torque request, that sets said throttle control signal equal to a throttle request when said throttle request is less than a throttle idle maximum, determines a throttle maximum increase when said throttle request is greater than said throttle idle maximum, determines said throttle control signal based on said throttle maximum increase and controls said throttle based on said throttle control signal.

12. The drag torque control system of claim 11 further comprising limiting said throttle request to a throttle maximum.

13. The drag torque control system of claim 11 further comprising wheel speed sensors that generate wheel speed signals, wherein said control module calculates and compares a wheel slip to a wheel slip threshold and limits said throttle control signal to said throttle idle maximum when said wheel slip is less than said wheel slip threshold.

14. The drag torque control system of claim 11 wherein said throttle maximum increase is determined based on engine speed and vehicle speed.

15. The drag torque control system of claim 14 wherein said throttle maximum increase is determined from a look-up table.

16. The drag torque control system of claim 11 wherein said throttle control signal is determined based on said throttle request, said throttle idle maximum, a previous throttle control signal and said throttle maximum increase.

17. The drag torque control system of claim 16 wherein said throttle control signal is a minimum between said throttle request and a maximum of said throttle idle maximum and a sum of said previous throttle control signal and said throttle maximum increase.

18. A method of controlling a throttle, comprising:
generating a throttle request based on a drag torque request;
setting a throttle command equal to said throttle request when said throttle request is less than a throttle idle maximum;
determining a throttle maximum increase when said throttle request is greater than said throttle idle maximum;
determining said throttle command based on said throttle maximum increase; and
controlling said throttle based on said throttle command.

19. The method of claim 18 further comprising limiting said throttle request to a throttle maximum.

20. The method of claim 18 further comprising:
storing said drag torque request in first and second memories;
comparing said drag torque request from said first and second memories to one another after generating said throttle request; and
limiting said throttle command to said throttle idle maximum if said drag torque request stored in said first memory is not equivalent to said drag torque request stored in said second memory.

21. The method of claim 18 further comprising:
comparing a wheel slip to a wheel slip threshold; and
limiting said throttle command to said throttle idle maximum when said wheel slip is less than said wheel slip threshold.

22. The method of claim 18 wherein said throttle maximum increase is determined based on engine speed and vehicle speed.

23. The method of claim 22 wherein said throttle maximum increase is determined from a look-up table.

24. The method of claim 18 wherein said throttle command is determined based on said throttle request, said throttle idle maximum, a previous throttle command and said throttle maximum increase.

25. The method of claim 24 wherein said throttle command is a minimum between said throttle request and a maximum of said throttle idle maximum and a sum of said previous throttle command and said throttle maximum increase.

26. A method of providing secure drag torque control in a vehicle engine, comprising:
generating a drag torque request;
storing said drag torque request and a corresponding timestamp in a first memory of a first control module;
storing said drag torque request and said corresponding timestamp in a second memory of a second control module;
reading a previous drag torque request and corresponding timestamp from said second memory of said second control module;
receiving said previous drag torque request and corresponding timestamp at said first control module;
comparing said previous drag torque request and said corresponding timestamp to drag torque requests and corresponding timestamps stored in said first memory to monitor for corrupted memory values; and
initiating drag torque control based on said previous drag torque request when said previous drag torque request and said corresponding timestamp of said second memory and one of said drag torque requests and corresponding timestamps of said first memory are equivalent.

27. The method of claim 26 further comprising indicating a fault when said previous drag torque request from said second memory is inconsistent with one of said drag torque requests and corresponding timestamps of said first memory.

28. The method of claim 26 further comprising setting a throttle command to a maximum idle value when said previous timestamp from said second memory is inconsistent with one of said timestamps from said first memory a threshold number of times.

29. The method of claim 26 further comprising:
generating a throttle request based on said drag torque request;
setting a throttle command equal to said throttle request when said throttle request is less than a throttle idle maximum;
determining a throttle maximum increase when said throttle request is greater than said throttle idle maximum;
determining said throttle command based on said throttle maximum increase; and
controlling said throttle based on said throttle command.

30. The method of claim 29 further comprising limiting said throttle request to a throttle maximum.

31. The method of claim 29 further comprising:
again storing said drag torque request in first and second memories;
again comparing said drag torque request from said first and second memories to one another after generating said throttle request; and
limiting said throttle command to said throttle idle maximum if said drag torque request stored in said first memory is not equivalent to said drag torque request stored in said second memory.

32. The method of claim 29 further comprising:
comparing a wheel slip to a wheel slip threshold; and
limiting said throttle command to said throttle idle maximum when said wheel slip is less than said wheel slip threshold.

33. The method of claim 29 wherein said throttle maximum increase is determined based on engine speed and vehicle speed.

34. The method of claim 33 wherein said throttle maximum increase is determined from a look-up table.

35. The method of claim 29 wherein said throttle command is determined based on said throttle request, said throttle idle maximum, a previous throttle command and said throttle maximum increase.

36. The method of claim 35 wherein said throttle command is a minimum between said throttle request and a maximum of said throttle idle maximum and a sum of said previous throttle command and said throttle maximum increase.

* * * * *